(12) United States Patent
Stafford et al.

(10) Patent No.: US 8,544,734 B1
(45) Date of Patent: Oct. 1, 2013

(54) METHOD OF PACKAGING AND ACTIVATING OPEN LOOP PREPAID CARDS

(75) Inventors: Brad Stafford, Louisville, KY (US); Rick Fletcher, Louisville, KY (US); Don Gayle, Shelbyville, KY (US); Mark Willis, Louisville, KY (US); Greg Hopper, Louisville, KY (US); James W. Polk, Jr., Georgetown, IN (US); Jamie Badgett, Louisville, KY (US)

(73) Assignee: Ceridian Stored Value Solutions, Inc., Louisville, KY (US)

( * ) Notice: Subject to any disclaimer, the term of this patent is extended or adjusted under 35 U.S.C. 154(b) by 593 days.

(21) Appl. No.: 12/721,956

(22) Filed: Mar. 11, 2010

(51) Int. Cl.
*G06K 5/00* (2006.01)
*G06K 15/00* (2006.01)
*G06K 7/00* (2006.01)
*G06K 19/00* (2006.01)

(52) U.S. Cl.
USPC ............ 235/380; 235/383; 235/486; 235/487

(58) Field of Classification Search
USPC ........... 235/375, 380–383, 487, 486; 705/35, 705/39–42, 44
See application file for complete search history.

(56) References Cited

U.S. PATENT DOCUMENTS

| | | | |
|---|---|---|---|
| 5,777,305 A * | 7/1998 | Smith et al. .................. | 235/380 |
| 6,224,108 B1 * | 5/2001 | Klure ............................. | 283/74 |
| 6,405,182 B1 * | 6/2002 | Cuervo .......................... | 705/43 |
| 6,454,165 B1 * | 9/2002 | Dawson ........................ | 235/381 |
| 6,588,658 B1 * | 7/2003 | Blank ............................ | 235/380 |
| 6,715,795 B2 * | 4/2004 | Klure ............................. | 283/62 |
| 6,846,278 B1 * | 1/2005 | Hill et al. ...................... | 493/419 |
| 7,191,939 B2 * | 3/2007 | Beck et al. .................... | 235/380 |
| 7,290,703 B2 * | 11/2007 | Jacobs .......................... | 235/380 |
| 7,494,056 B2 | 2/2009 | Sturm | |
| 7,512,566 B1 | 3/2009 | Fellner | |
| 7,584,887 B1 | 9/2009 | Sanchez et al. | |
| 7,624,921 B1 | 12/2009 | Beck et al. | |
| 2007/0045401 A1 * | 3/2007 | Sturm .......................... | 235/380 |
| 2007/0210152 A1 | 9/2007 | Read | |
| 2008/0217415 A1 * | 9/2008 | Royer ........................... | 235/493 |
| 2009/0218392 A1 * | 9/2009 | Biskupski et al. ............ | 235/375 |
| 2009/0283594 A1 * | 11/2009 | Walton et al. ................ | 235/383 |

\* cited by examiner

*Primary Examiner* — Steven S. Paik
*Assistant Examiner* — April Taylor
(74) *Attorney, Agent, or Firm* — Waddey & Patterson, P.C.; Edward D. Lanquist, Jr.; Gary L. Montle

(57) ABSTRACT

A method is provided for packaging and activating open loop stored value cards. A retailer is provided an open loop card and a closed loop card in an integrated package, the open loop card associated with a first account number and configured for activation by an open loop account processor, and the closed loop card associated with a second account number. An electronically readable card component contains data corresponding to a control account including the first and second account numbers. Upon receiving an activation request from a point of sale which contains the data corresponding to the control account, the control account and the account numbers are identified, and the closed loop card is activated. An activation request is transmitted electronically to the open loop account processor, wherein activating of the closed and open loop cards may be substantially simultaneous with respect to the point of sale.

24 Claims, 5 Drawing Sheets

US 8,544,734 B1

METHOD OF PACKAGING AND ACTIVATING OPEN LOOP PREPAID CARDS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

BACKGROUND OF THE INVENTION

The present invention relates generally to the packaging and activation of stored value cards. More particularly, the present invention relates to various methods of packaging open loop cards which are effective to offset the fees associated with their activation and provide further incentives to retailers for offering and promoting their sale.

Open loop cards gift cards have obtained a wide acceptance in the marketplace. Open loop cards are either network branded cards available to be used at participating merchants, or private label cards available for use at select or even single merchants. To obtain the card, a consumer takes the card off of the shelf and presents the card to the cashier. The cashier for the retailer then swipes or scans the control number which is then transmitted to a host to activate the card. The host identifies the control number, and activates the open loop account number linked on the host system. The retailer receives an approval message from a host system authorizing the request for either the amount predefined on the card, or the amount requested in the original message. Unfortunately, a fee is typically assessed to purchase these types of cards that are available for use on the payment network.

Open loop gift cards offer convenience, but at a price. A consumer pays an activation fee that can equal ten to fifteen percent of the value of the card. These activation fees in effect increase the cost of providing the gift, but provide no tangible benefit to either the purchaser or receiver of the card. Additionally, retailers who sell these cards have little control or ability to differentiate their services in the marketplace. Thus competition relative to performance and service is hindered. To lower the overall cost to the consumer, and allow sellers to differentiate themselves in the marketplace, a new and improve method of activating these cards is required.

BRIEF SUMMARY OF THE INVENTION

An embodiment of the present invention is directed to a method of simultaneously activating an open loop card and a subsequent closed loop promotional card that does not expire. In accordance with the method, a magnetic stripe or barcode located on either the packaging or one of the cards. The account number associated with the magnetic stripe or barcode is used as a control account on the host system. The control account located on the host system contains the actual account number(s) on the host system for the open loop and closed loop card(s). The host system identifies the control account, and activates all associated account numbers when a request is received from the point of sale. The value maintained on the host system for each account can take the form of a monetary or unit value. Additionally, each account number activated may have rules and conditions of use that are unique to the account number. For the purchase of a $25 open loop card, a consumer may for example now also have received an additional $5 closed loop card that offsets the fees charged to activate the open loop card. The purchaser and/or consumer are now receiving an additional offer for their open loop purchase consideration.

Another embodiment of the present invention is directed to a method of simultaneously activating an open loop card and subsequent closed loop gift card(s). In accordance with the method, a magnetic stripe or barcode located on either the packaging or one of the cards. The account number associated with the magnetic stripe or barcode is used as a control account on the host system. The control account located on the host system contains the actual account number(s) on the host system for the open loop and closed loop card(s). The host system identifies the control account, and activates all associated account numbers when a request is received from the point of sale. The value maintained on the host system for each account can take the form of a monetary or unit value. Additionally, each account number activated may have rules and conditions of use that are unique to the account number. For the purchase of a $25 open loop card, a consumer may now also receive an additional $5 value in a closed loop gift card.

Yet another embodiment of the present invention is directed to a method of simultaneously activating an open loop card and a subsequent closed loop promotional card in which the closed loop promotional card has an expiration date that is offset from the activation date. In accordance with the method, a magnetic stripe or barcode located on either the packaging or one of the cards. The account number associated with the magnetic stripe or barcode is used as a control account on the host system. The control account located on the host system contains the actual account number(s) on the host system for the open loop and closed loop card(s). The host system identifies the control account, and activates all associated account numbers when a request is received from the point of sale. The closed loop card whose redemption period that begins from a specified number of days after activation occurs subsequently begins the offset delay that will trigger the redemption period. The value maintained on the host system for each account can take the form of a monetary or unit value. Additionally, each account number activated may have rules and conditions of use that are unique to the account number. For the purchase of a $25 open loop card, a consumer may now also have received an additional $5 closed loop card to offset the fees charged to activate the open loop card.

Yet another embodiment of the present invention is directed to a method of simultaneously activating an open loop card and a subsequent closed loop promotional card in which the closed loop promotional card is related to the purchase of a particular product or family of products. In accordance with the method, a magnetic stripe or barcode located on either the packaging or one of the cards. The account number associated with the magnetic stripe or barcode is used as a control account on the host system. The control account located on the host system contains the actual account number(s) on the host system for the open loop and closed loop card(s). The host system identifies the control account, and activates all associated account numbers when a request is received from the point of sale. The value maintained on the host system for each account can take the form of a monetary or unit value. Additionally, each account number activated may have rules and conditions of use that are unique to the account number. For the purchase of a $25 open loop card, a consumer may now also have received an addition $5 closed loop card to purchase specific products to offset the fees charged to activate the open loop card.

Yet another embodiment of the present invention is directed to a method of simultaneously activating an open loop card and a subsequent closed loop promotional card in which the closed loop promotional card has a secret value assigned to it. In accordance with the method, a magnetic stripe or barcode located on either the packaging or one of the cards. The account number associated with the magnetic stripe or barcode is used as a control account on the host system. The control account located on the host system contains the actual account number(s) on the host system for the open loop and closed loop card(s). The host system identifies the control account, and activates all associated account numbers when a request is received from the point of sale. The closed loop card, which has a hidden value, can not have its value determined until the redemption period begins. The value maintained on the host system for each account can take the form of a monetary or unit value. Additionally, each account number activated may have rules and conditions of use that are unique to the account number. For the purchase of a $25 open loop card, a consumer may now also have received an additional $5, or a $500 closed loop card to offset the fees charged to activate the open loop card.

Yet another embodiment of the present invention is directed to a method of simultaneously activating an open loop card and subsequent location specific closed loop promotional card(s). In accordance with the method, a magnetic stripe or barcode located on either the packaging or one of the cards. The account number associated with the magnetic stripe or barcode is used as a control account on the host system. The control account located on the host system contains the actual account number(s) on the host system for the open loop and closed loop card(s). The host system identifies the control account, and activates all associated account numbers when a request is received from the point of sale. The value maintained on the host system for each account can take the form of a monetary or unit value. Additionally, each account number activated may have rules and conditions of use that are unique to the account number. For the purchase of a $50 open loop card, a consumer may now also purchase an additional $10 closed loop card good for purchases only at select locations for a merchant.

Yet another embodiment of the present invention is directed to a method of simultaneously activating an open loop card and a subsequent additional open loop card. In accordance with the method, a magnetic stripe or barcode located on either the packaging or one of the cards. The account number associated with the magnetic stripe or barcode is used as a control account on the host system. The control account located on the host system contains the actual account number(s) on the host system for both open loop cards. The host system identifies the control account, and activates all associated account numbers when a request is received from the point of sale. The value maintained on the host system for each account can take the form of a monetary or unit value. Additionally, each account number activated may have rules and conditions of use that are unique to the account number. For the cost of a single activation fee, the consumer may now also have purchased additional open loop cards with only a single fee charged to activate the open loop card.

Yet another embodiment of the present invention is directed to a method of simultaneously activating an open loop card and a subsequent proxy card in which the proxy card account allows the users to add awarded funds to a gift card. In accordance with the method, a magnetic stripe or barcode located on either the packaging or one of the cards. The account number associated with the magnetic stripe or barcode is used as a control account on the host system. The control account located on the host system contains the actual account number(s) on the host system for the open loop and closed loop card(s). The host system identifies the control account, and activates all associated account numbers when a request is received from the point of sale. The proxy card contains an account value than can be subsequently transferred to any participating merchant's gift card. The value maintained on the host system for each account can take the form of a monetary or unit value. Additionally, each account number activated may have rules and conditions of use that are unique to the account number. For the purchase of a $25 open loop card, a consumer may now also have received an additional $5 to be applied to any gift card in the consumer's wallet.

Yet another embodiment of the present invention is directed to a method of simultaneously activating an open loop card and a subsequent loyalty card in which the loyalty account is activated with a preset reward value related to the purchased of the open loop card. In accordance with the method, a magnetic stripe or barcode located on either the packaging or one of the cards. The account number associated with the magnetic stripe or barcode is used as a control account on the host system. The control account located on the host system contains the actual account number(s) on the host system for the open loop and loyalty card. The host system identifies the control account, and activates all associated account numbers when a request is received from the point of sale. The loyalty card contains an account value than can be subsequently be redeemed upon registration by the consumer. The value maintained on the host system for each account can take the form of a monetary or unit value. Additionally, each account number activated may have rules and conditions of use that are unique to the account number. For the purchase of a $25 open loop card, a consumer may now also have received an additional $5 to the reward balance of their loyalty account.

Yet another embodiment of the present invention is directed to a method of activating an open loop card through the presence of a product. In accordance with the method, a magnetic stripe or barcode located on either the packaging or one of the cards. The account number associated with the magnetic stripe or barcode is used as a control account on the host system. The control account located on the host system contains the actual account number(s) on the host system for the open loop card(s). The host system identifies the control account, and activates the open loop account number(s) when a request is received from the point of sale containing the specific product (or family thereof). The value maintained on the host system for each account can take the form of a monetary or unit value. Additionally, each account number activated may have rules and conditions of use that are unique to the account number.

Yet another embodiment of the present invention is directed to a method of activating an open loop card and adding additional value to the open loop card. In accordance with the method, a magnetic stripe or barcode located on either the packaging or one of the cards. The account number associated with the magnetic stripe or barcode is used as a control account on the host system. The control account located on the host system contains the actual account number(s) on the host system for the open loop card(s). The host system identifies the control account, and activates the open loop account number(s) when a request is received from the point of sale containing a purchase amount or product. Upon spending an appropriate amount, or qualifying products, additional funds may be added to the account in accordance with program rules. The value maintained on the host system for each account can take the form of a monetary or unit value.

Yet another embodiment of the present invention is directed to a method of activating an open loop card and a closed loop card. In accordance with the method, a magnetic stripe or barcode located on either the packaging or one of the cards. The account number associated with the magnetic stripe or barcode is used as a control account on the host system. The control account located on the host system contains the actual account number(s) on the host system for the open loop and loyalty card. The host system identifies the control account, and activates the open loop card, and enables the closed loop card from point of sale. The closed loop card is held in a status that allows the card to be activated upon completing a secondary task such as a web registration, but can not be registered unless the open loop card has been activated. Upon completing the secondary task, an additional message is sent to the host to complete the closed loop cards activation. The value maintained on the host system for each account can take the form of a monetary or unit value. Additionally, each account number activated may have rules and conditions of use that are unique to the account number.

Yet another embodiment of the present invention is directed to a method of activating an open loop card and a closed loop card wherein a plurality of magnetic stripes or barcodes are located on the open loop card. A first account number associated with the first magnetic stripe or barcode is for activation of the open loop card consistent with any predetermined conditions of use that are unique to the first account number. A second account number associated with the second magnetic stripe or barcode is for adding value to the closed loop card consistent with any further predetermined conditions that are unique to the second account number. The value maintained on the host system for each account can take the form of a monetary or unit value.

Yet another embodiment of the present invention is directed to a method of packaging the open and closed loop card together. In accordance with this method the open or the closed loop account number may be visible from the packaging, and may represent the control account listed in the aforementioned embodiments. Conversely, both the open and closed loop account numbers may be concealed within the packaging with only a control number visible to be swiped, scanned, or keyed at the point of sale.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "open loop card" as used herein may refer to any prepaid stored value card as known in the art that is activated by an entity further referred to herein as an open loop processor and with respect to a particular purchaser or consumer, unless the context dictates otherwise.

The term "closed loop card" as used herein may refer to any closed or semi-closed loop card as known in the art which is prepaid but not indicative of a particular purchaser or customer, and does not require activation by an entity referred to herein as an open loop processor, unless the context dictates otherwise.

The term "open loop processor" or "open loop account processor" as used herein refers to an entity which is effective to activate an open loop card in return for an activation fee, in accordance with various statutory or other requirements as known in the art and not further described herein, including but not limited to for example the Patriot Act. The open loop processor may be a separate entity from that performing the various steps of the method of the present invention, but in various embodiments the open loop processor may be the same as or otherwise under the control of the host system, or performing entity with respect to the steps of the method.

Unless otherwise stated, a "value" for an open loop card or a closed loop card may take the form of either or both of a monetary or a unit value as defined by the issuer of the associated card. Unless otherwise stated, "unit value" may be understood broadly within a scope known to those of skill in the art, and may for example and without limitation include complementary goods, services, reward points, or any equivalent redeemable structure against goods and/or services, either in whole or in part, as may be defined by the issuer of the associated card.

Figure 3:
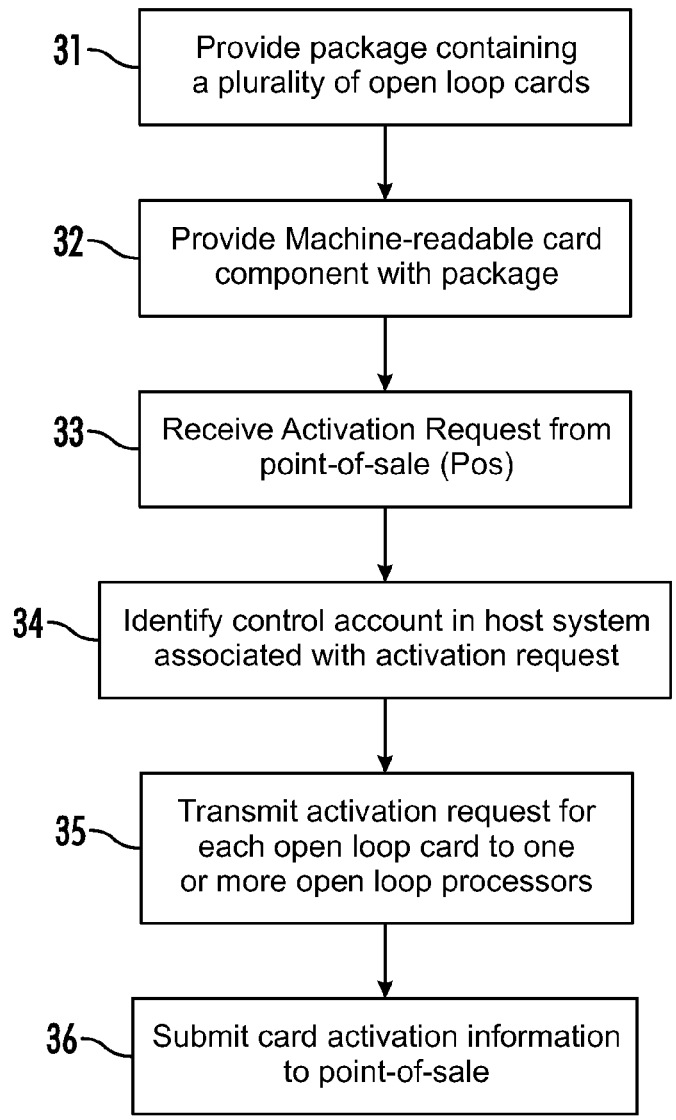
FIG. 3 is a flowchart showing another embodiment of the method of the present invention.
Figure 4:
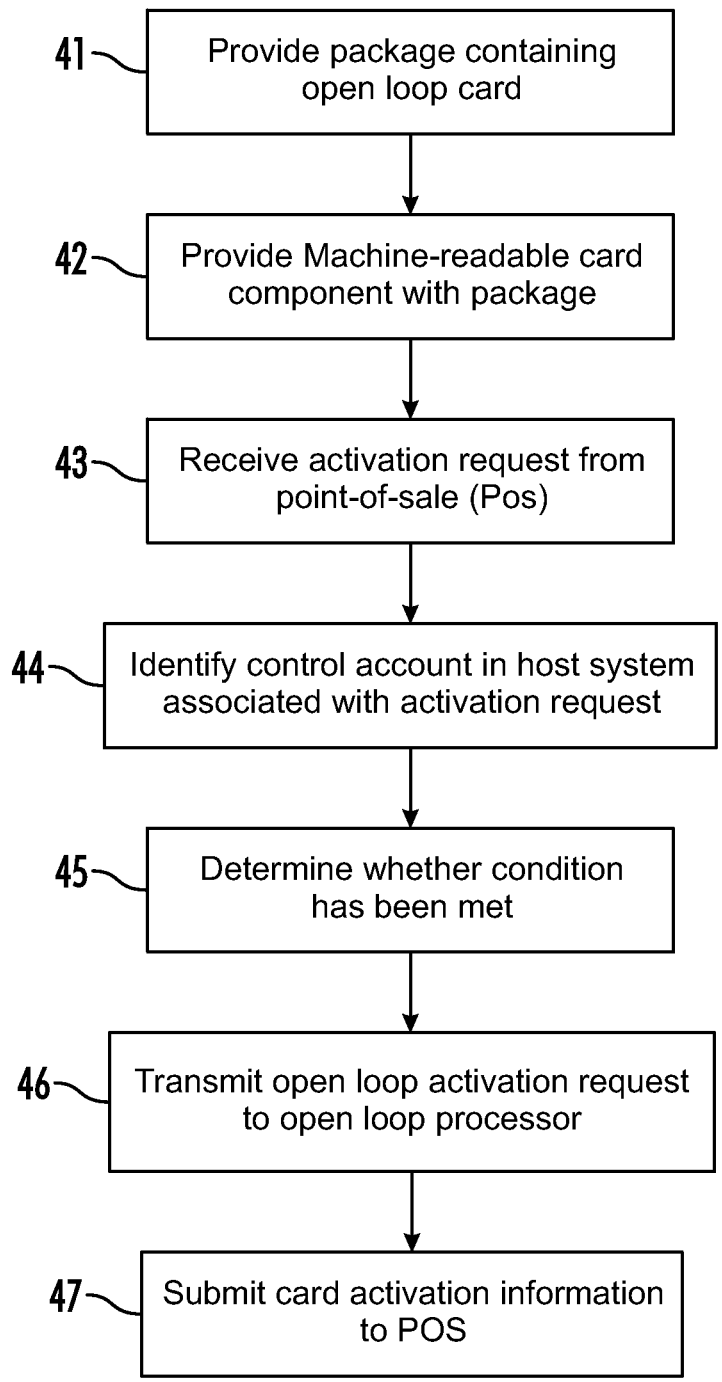
FIG. 4 is a flowchart showing another embodiment of a method of the present invention.
Figure 5:
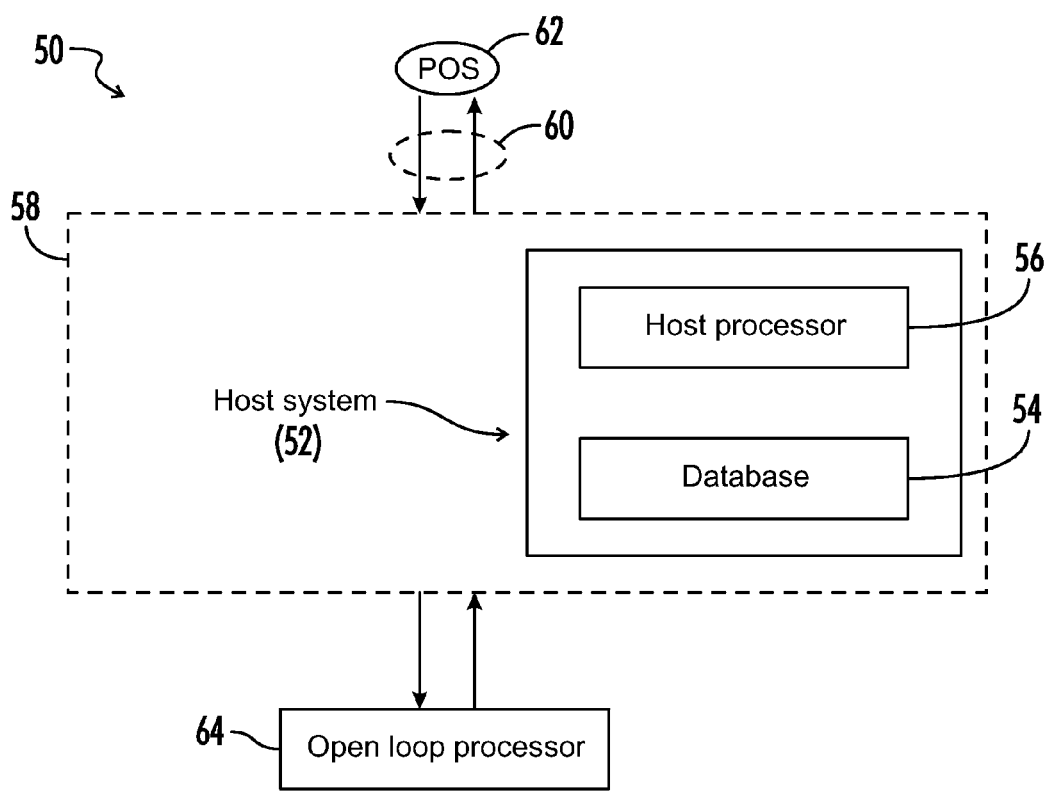
FIG. 5 is a block diagram representing an embodiment of a system of the present invention.

Referring generally to FIGS. 1-5, various embodiments of a method of packaging and activating open loop cards are herein described, and of a system which may be used for performing the same. Referring first to FIG. 5, a system 50 configured for performing the steps of the method may include a host system 52 using at least a database 54 and a host processor 56 residing on a server 58 accessible via a local or global communications network 60 to a point of sale 62 for a merchant or retailer offering a card package for sale. The host system 52 may be integrally associated with a particular merchant or retailer, or may be integrally associated with an open loop card issuer, or may be a third party providing services specific to the steps of the method independent of the open loop card issuer and the merchant. An open loop processor 64 is provided for performing steps required for activation of the open loop card(s) as known in the art. The open loop processor 64 may be separately located from the host system 52 or may for example be formed of a separate computer program within the same physical confines as the host processor 56, or may reside on the same server 58 but in a separate processing system, each within the scope of the present invention.

Figure 1:
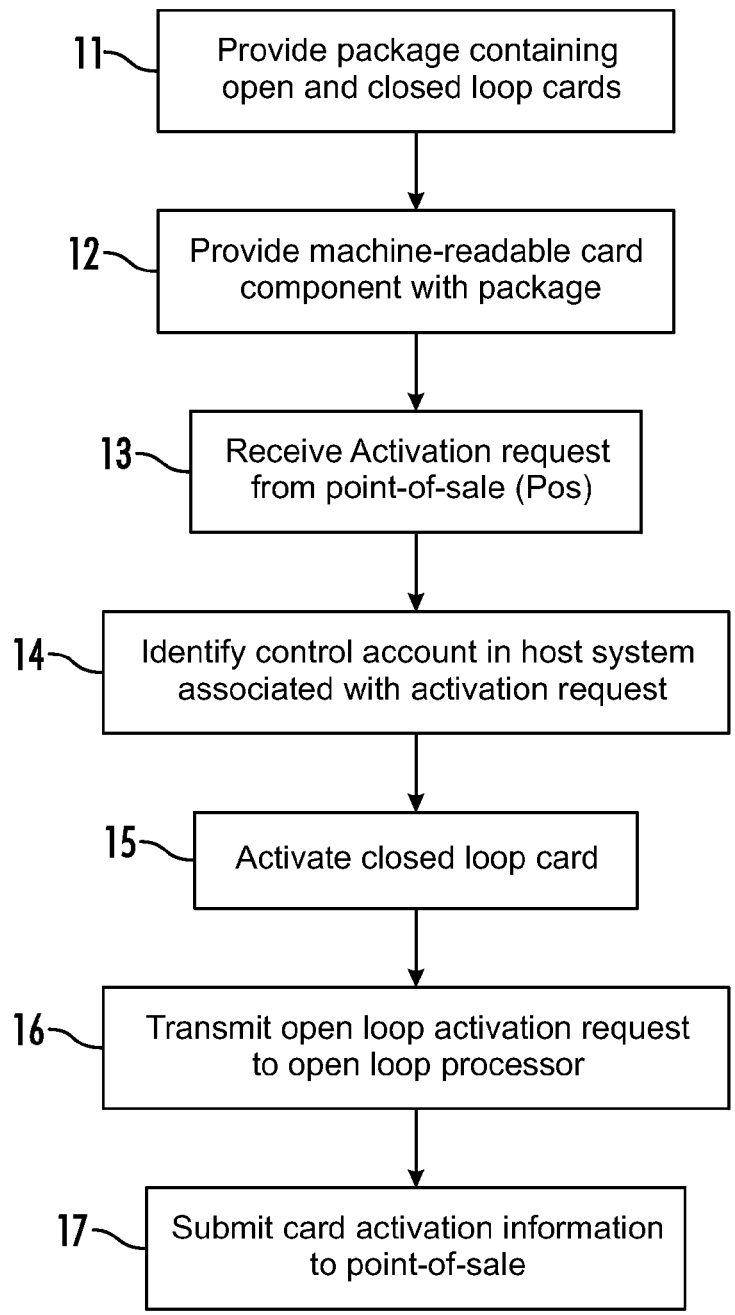
FIG. 1 is a flowchart showing an embodiment of the method of the present invention.

Referring now to FIG. 1, in an embodiment a method 10 within the scope of the present invention is provided for packaging an open loop card alongside one or more closed loop cards and activating each of the packaged cards. The inclusion of a closed loop card may benefit the merchant/retailer who offers the cards for sale, as the closed loop card allows the merchant to differentiate their services in their marketplace in a manner that an open loop card does not. The inclusion of a closed loop card further may benefit the purchaser of the open and closed loop cards, as the closed loop card may offset fees associated with the purchase of the open loop card, or otherwise provide incentives to purchase the cards which are not associated with the open loop card.

A first step 11 of the method 10 includes providing by a host system an open loop card and one or more closed loop cards positioned within an integrated package. The package in various embodiments may be secured in such a fashion that any tampering with the package to access the secured cards would be easily recognizable by a cashier or equivalent entity at a point of sale and activation of the cards may be voided to mitigate some of the risks of fraud. The open loop card and the closed loop cards may each generally include a visible account number which is associated with an open loop account and a closed loop account, respectively, which may be operated by the host system and may further include various rules and conditions of use that are unique to the particular accounts. In various embodiments however either or both of the account numbers may not be visible on the cards but instead encoded within a machine readable card component such as for example a barcode or a magnetic stripe.

A second step 12 of the method 10 includes providing a machine readable card component on the exterior of the package, such that an electronic card reader at a point of sale associated with a retailer or merchant offering the card package for sale may read information encoded in the machine readable card component. The machine readable card component may include an encoded control account number which is associated with a control account operated by the host system. The control account further includes the account numbers for both of the open and closed loop cards, with the card account numbers in various embodiments linked by the host system to the control account during the packaging step.

The machine readable card component in various embodiments may be for example a barcode, a magnetic stripe, RFID transceiver, or even one or more of the account numbers associated with the open loop card or the one or more closed loop cards. If the machine readable card component is a barcode, a magnetic stripe, RFID transceiver, or other equivalent electronically readable component, the account numbers of the open and closed loop cards may be concealed within the packaging for at least various anti-fraud and security purposes. If the machine readable card component is one or more of the account numbers which are visible for manual entry at a point of sale into a machine, the package may be partially open to expose the account number physically disposed on the associated card, or the cards may be concealed fully within the package but with one or more of the account numbers physically duplicated on the exterior of the package.

In an embodiment a plurality of machine readable card components may be provided on the open loop card, with a first machine readable card component being associated with an account number for the open loop card and one or more additional machine readable card components further provided in association with accounts for each attached closed loop card. One or more of the machine readable card components in such an embodiment may be exposed and accessible at a point of sale from outside of any package within which the cards are secured.

A third step 13 of the method 10 includes receiving at the host system an activation request from a point of sale associated with a retailer or merchant offering the package for sale. When the package is presented at the point of sale either alone or as part of a larger purchase, the machine readable component is manually entered, scanned, swiped or otherwise read from the package in any of a variety of manners well known in the art. An activation request is then submitted to the host system containing the control account number associated with the machine readable card component.

A fourth step 14 of the method 10 includes identifying by the host system the control account based on the control account number received from the point of sale in accordance with the activation request. The control accounts may reside on a database within a computer system operated by the host system, or may for example reside on a secure online database accessible by the host system. After identifying the control account, the host system may further compare account numbers associated with the control account to account numbers provided from the point of sale, if such information has been provided. Alternatively, only the control account number may be provided from the point of sale, in which case no comparison is performed in this step. In various embodiments the host system may further identify rules or conditions associated with the account numbers and compare the rules or conditions with the status of the purchase associated with the activation request, whereby a determination of whether the cards should be activated immediately may be made by the host system based on predetermined criteria. The rules and conditions associated with the account numbers may generally be specific to each account, although in certain embodiments the rules and conditions may optionally be made equivalent.

In a fifth step 15 of the method 10, the host system activates the one or more closed loop cards.

In various embodiments of the fifth step 15, the one or more closed loop cards may be promotional cards of a fixed value, with no additional fee and no expiration date. Alternatively, in various embodiments the one or more closed loop cards may be gift cards having a value selected by the retailer or by a purchaser at the point of sale, also with no additional fee and no expiration date.

In alternative embodiments one or more promotional closed loop cards may have an expiration date, either a fixed date or indicative of a fixed period of time measured from the date of card activation.

In another embodiment one or more closed loop cards may be promotional cards having conditions of use such that the value associated with the cards is only applicable toward a particular product, or family of products, associated with the retailer or merchant providing the cards for sale.

In another embodiment one or more closed loop cards may be promotional cards having a hidden value which is only known to the purchaser or the consumer after purchase and subsequent activation of the closed loop cards. In such embodiments the method 10 may include an additional step of determining a value for the closed loop card, and transmitting the determined value to the point of sale for disclosure to the purchaser. In alternative embodiments the value may remain hidden until the promotional card is actually redeemed for use against a subsequent purchase. The hidden value may be predetermined and stored alongside the account number for the promotional card, or may be determined at the time of activation from a plurality of values within a predetermined range or otherwise in accordance with criteria set by either or both of the host system and the retailer.

In another embodiment one or more closed loop cards may be promotional cards having conditions of use such that value of the card may be applicable only with respect to one or more particular locations associated with the retailer or merchant.

In another embodiment a closed loop card may be a proxy card associated with a proxy account containing value that may be transferred by a purchaser or consumer after activation of the proxy account to another card selected by the purchaser or consumer. In various embodiments the transferable value may be restricted to transfers to cards associated with the particular merchant or retailer offering the proxy card as part of the package.

In another embodiment a closed loop card may be a loyalty card associated with a loyalty account and having a predetermined reward value which may be transferred to the loyalty account upon successful purchase and activation of the open loop card. The loyalty account may be a preexisting account associated with a purchaser or consumer and supplemented in value by the value included in the loyalty card, or may be a new loyalty account which is established by the merchant or retailer upon activation of the loyalty card and includes value which may be redeemed by the purchaser or consumer upon registration of the loyalty account.

In a sixth step 16 of the method 10, the host system transmits an open loop activation request for the open loop card to an open loop processor. The open loop processor may be a separate entity associated with the open loop card and having independent rules and conditions which must be satisfied prior to activation of the open loop card, or alternatively the open loop processor may be the same entity as the host system or otherwise within the control of the host system such that the open loop activation request simply involves performing by the host system whichever additional steps are required within a particular jurisdiction for open loop card activation.

In various embodiments of the method 10, a further step 17 may include submitting information from the host system to the point of sale indicating activation of any cards which have been so activated by the host system. Activation of the open loop card and the one or more closed loop cards may therefore appear substantially simultaneous with respect to the point of sale.

Figure 2:
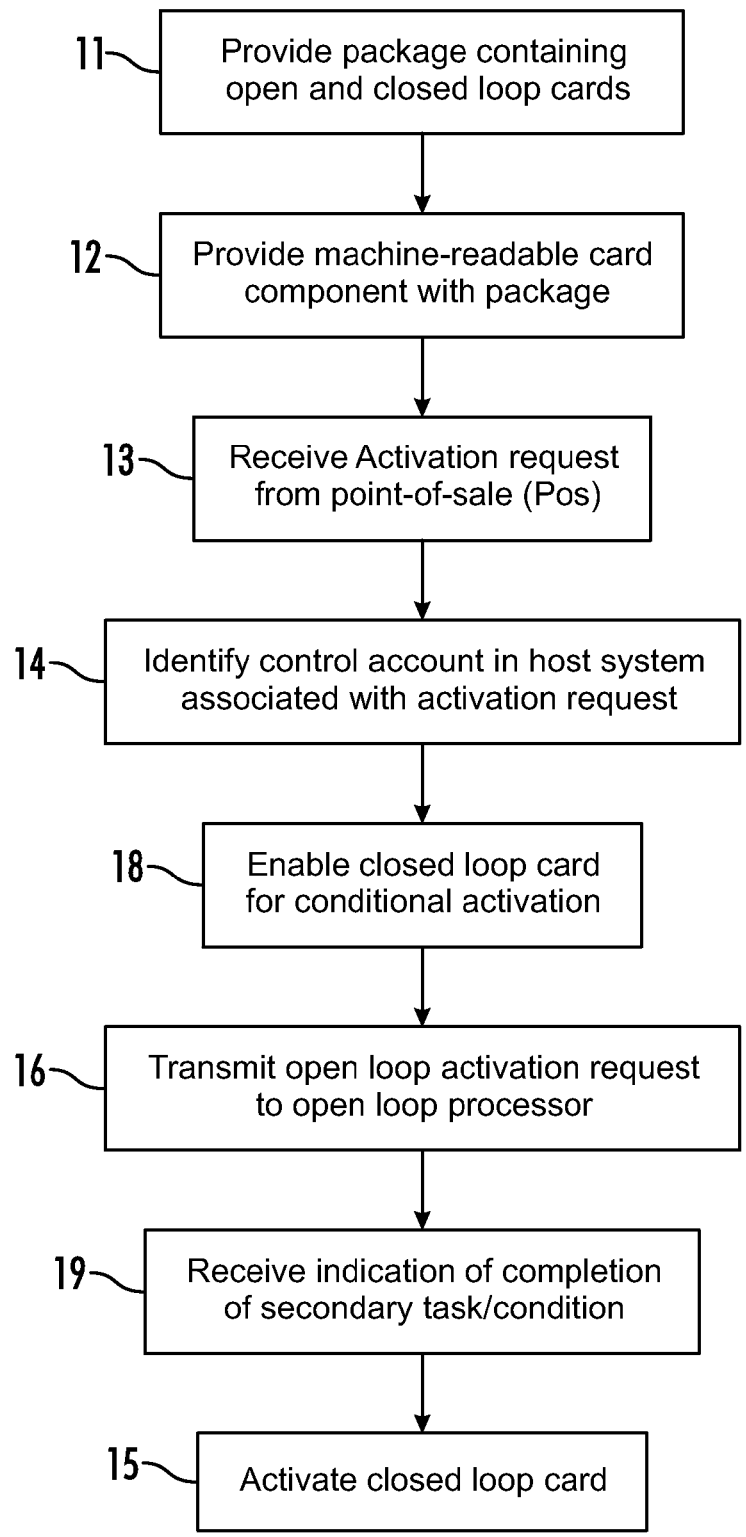
FIG. 2 is a flowchart showing another embodiment of the method of the present invention.

Referring now to FIG. 2, in an alternative embodiment of the method 10 shown in FIG. 1, in a fifth step 18 a closed loop card may be enabled by the host system but held in a conditional status allowing activation at a later time, with activation contingent upon both activation of the open loop card and also the completion of a secondary task. The secondary task may be for example a web-based registration associated with the merchant or retailer, but may be any form of condition as known in the art which is predetermined by the merchant or retailer as an incentive for offering the value associated with the closed loop card.

A sixth step 16 of the embodiment shown in FIG. 2 may be substantially the same as with the sixth step 16 of FIG. 1. A seventh step 19 however may include receiving a message or equivalent indication that the secondary task has been completed. The message in various embodiments may be received by the host system from the point of sale, but may be anticipated as being received for example from a web server corresponding with a web-based registration designated as the secondary task, or a number of other sources as may be foreseeable to one of skill in the art.

An eighth step 15 of the method shown in FIG. 2 may be substantially the same as the fifth step 15 of FIG. 1, wherein the closed loop card is activated by the host system for use by the purchaser or consumer upon confirming completion of the secondary task.

Referring now to FIG. 3, in an embodiment a method 30 within the scope of the present invention is provided for packaging a first open loop card alongside one or more additional open loop cards and activating each of the packaged cards for a single activation fee. Some distinctions between the embodiment of FIG. 3 and the embodiment shown in FIG. 1 may be illustrated below but are not necessarily limited to those described, and various features of the embodiment of FIG. 3 are substantially the same as those of FIG. 1 and may be omitted from further description as redundant.

A first step 31 of the method 30 includes providing by a host system one or more open loop cards positioned within an integrated package as previously described. The open loop cards may each generally include a visible account number operated by the host system in association with an account having various rules and conditions of use that are unique to the particular accounts. The account numbers may be visible on the cards or alternatively encoded by the host system within a machine readable card component such as for example a barcode or a magnetic stripe.

A second step 32 of the method 30 includes providing a machine readable card component on the exterior of the package in an equivalent manner to that described with respect to the embodiment of FIG. 1.

A third step 33 of the method 30 includes receiving at the host system an activation request from a point of sale associated with a retailer or merchant offering the package for sale, likewise in an equivalent manner to that described with respect to the embodiment of FIG. 1.

A fourth step 34 of the method 30 includes identifying by the host system the control account based on the control account number received from the point of sale in accordance with the activation request, likewise in a substantially equivalent manner to that described with respect to the embodiment of FIG. 1.

In a fifth step 35 of the method 30, the host system transmits open loop activation requests for each of the open loop cards to one or more open loop processors. One or more of the open loop processors may be separate entities associated with an open loop card and having independent rules and conditions which must be satisfied prior to activation of the open loop card, or alternatively one or more of the open loop processors may be the same entity as the host system or otherwise within the control of the host system such that at least part of the open loop activation request simply involves performing by the host system whichever additional steps are required within a particular jurisdiction for open loop card activation. In accordance with various embodiments of the step, only one activation fee is required for activation of the one or more open loop cards.

In various embodiments of the method 30, a further step 36 may include submitting information from the host system to the point of sale indicating activation of any cards which have been so activated by or through the host system. Activation of the one or more open loop cards may therefore appear substantially simultaneous with respect to the point of sale.

Referring now to FIG. 4, in an embodiment a method 40 within the scope of the present invention is provided for packaging an open loop card and activating the open loop card upon completion of a predetermined condition of activation. The inclusion of a condition may benefit the merchant/retailer offering the card for sale, as the condition may allow the merchant to market or otherwise differentiate their services in a manner that an open loop card by itself does not. Some distinctions between the embodiment of FIG. 4 and the embodiment shown in FIG. 1 may be illustrated below but are not necessarily limited to those described, and various features of the embodiment of FIG. 4 are substantially the same as those of FIG. 1 and may be omitted from further description as redundant.

A first step 41 of the method 40 includes providing by a host system an open loop card positioned within an integrated package as described with respect to previous embodiments. The open loop card may generally include a visible account number which is associated with an open loop account operated by the host system and further including various rules and conditions of use that are unique to the particular account. In various embodiments however the account number may not be visible on the card but instead encoded within a machine readable card component.

A second step 42 of the method 40 includes providing a machine readable card component on the exterior of the package and a control account number associated with the machine readable card component, as described with respect to previous embodiments.

A third step 43 of the method 40 includes receiving at the host system an activation request from a point of sale associated with a retailer or merchant offering the package for sale. When the package is presented at the point of sale either alone or as part of a larger purchase, the machine readable component is manually entered, scanned, swiped or otherwise read from the package in any of a variety of manners well known in the art. An activation request is then submitted to the host system containing the control account number associated with the machine readable card component.

A fourth step 44 of the method 40 includes identifying by the host system the control account based on the control account number received from the point of sale in accordance with the activation request, as described with respect to previous embodiments.

In a fifth step 45 of the method 40, the host system determines whether or not the open loop card is to be activated based upon one or more predetermined criteria.

In an embodiment, activation of the open loop card is approved when the card package is purchased alongside a particular product or one of a plurality of products specified by the merchant or retailer. The host system in the fifth step 45 may receive additional information regarding the scope of the current purchase and compare the purchased products to the criteria to determine whether activation is appropriate.

In another embodiment of the fifth step 45, the host system may approve activation of the open loop card and further add a predetermined value to the open loop card upon determining that one or more predetermined criteria have been met. The predetermined criteria may be set by the retailer or merchant for example, and may include a threshold amount of money spent in a particular purchase, or the purchase of a particular product or a product from a particular family of products as part of a particular purchase. The host system within the scope of the fifth step 45 may compare details of the purchase received from the point of sale to the predetermined criteria and approve activation of the open loop card, as well as add the predetermined value to the card. The predetermined value may be a specific value regardless of the details of the purchase, may be selected from a predetermined range depending on the details of the purchase, or may be calculated in accordance with a predetermined algorithm depending on the details of the purchase, whereby for example the value added may increase with the size of a particular purchase.

In a sixth step 46 of the method 40, the host system upon approving activation based on the purchase details and the predetermined criteria transmits an open loop activation request for the open loop card to an open loop processor as defined and described with respect to previous embodiments.

In various embodiments of the method 40, a further step 47 may include submitting information from the host system to the point of sale indicating activation of the card and any amount of value which may have been added to the card with respect to the fifth step 45.

The previous detailed description has been provided for the purposes of illustration and description. Thus, although there have been described particular embodiments of the present invention of a new and useful "Method of Packaging and Activating Open Loop Prepaid Cards," it is not intended that such references be construed as limitations upon the scope of this invention except as set forth in the following claims.

What is claimed is:

1. A method of packaging and activating open loop cards, the method comprising:
   providing to a retailer an open loop card and a closed loop card in an integrated package, the open loop card associated with a first account number which is configured for activation by an open loop account processor, the closed loop card associated with a second account number and having a value selected from a range of values, the value being hidden from a purchaser until after activation of the closed loop card;
   providing a machine readable card component containing data corresponding to a control account, the control account further comprising the first and second account numbers;
   receiving an activation request from a point of sale associated with the retailer containing data corresponding to the control account;
   identifying the control account and the first and second account numbers;
   activating the closed loop card in accordance with the second account number; and
   transmitting electronically an activation request comprising the first account number to the open loop account processor.

2. The method of claim 1, wherein the open loop card and the closed loop card are independently valued in the form of either a monetary value or a unit value.

3. The method of claim 1, wherein activating of the closed loop card and activating of the open loop card is substantially simultaneous with respect to the point of sale.

4. The method of claim 1, the closed loop card having a location specific value.

5. The method of claim 1, the closed loop card comprising a proxy card, wherein the second account number is associated with a value transferable by a purchaser to an associated stored value card.

6. The method of claim 1, the closed loop card comprising a loyalty card having a fixed value redeemable by a purchaser upon registration to a loyalty account associated with the retailer.

7. The method of claim 1, wherein the second account number has a fixed expiration date.

8. The method of claim 1, wherein the second account number has an expiration time period which tolls from the date of activation.

9. The method of claim 1, wherein the step of activating the closed loop card comprises enabling the closed loop card for activation based upon completion of a predetermined condition.

10. The method of claim 1, wherein the data corresponding to the control account comprises a visible control number, wherein the first and second account numbers are concealed from view within the integrated package.

11. The method of claim 1, wherein the data corresponding to the control account comprises one or both of the first and second account numbers, the one or both account numbers visible from outside the integrated package.

12. The method of claim 1, further comprising first and second machine readable card components on said open loop card, said first machine readable card component associated with said first account and containing data associated with predetermined conditions for activating the open loop card, said second machine readable card component associated with said second account and containing data associated with predetermined conditions for adding value to the closed loop card.

13. A method of providing and activating open loop cards and closed loop cards, the method comprising:

providing for sale an open loop card and a closed loop card in an integrated package, the open loop card associated with a first account number which is configured for activation by an open loop account processor, the closed loop card associated with a second account number, the integrated package further comprising a machine readable card component encoded with an account number corresponding to a control account residing in a database, the control account further comprising the first and second account numbers and activation criteria for at least the closed loop card;

reading said control account number from the machine readable card component using an electronic card reader associated with a point of sale;

generating purchase status information associated with the activation criteria for the closed loop card;

receiving activation information from a remote computer system communicatively linked to the point of sale, said activation information regarding activation of the open loop card by the open loop account processor and activation of the closed loop card by the remote computer system.

14. The method of claim 13, wherein the activation information regarding activation of the closed loop card comprises a conditional status allowing activation of the closed loop card contingent upon activation of the open loop card and further satisfying a secondary condition by a purchaser of the closed loop card, the method further comprising the steps of:

determining that the secondary condition has been satisfied by the purchaser;

notifying the remote computer system that the secondary condition has been satisfied in association with the closed loop card; and receiving activation information from the remote computer system indicating that the closed loop card has been activated.

15. The method of claim 14, wherein the step of determining that the secondary condition has been satisfied by the purchaser comprises:

determining at the point of sale that the secondary condition has been satisfied by the purchaser in accordance with the purchase.

16. The method of claim 14, the secondary condition comprising a web-based registration with a merchant associated with the point of sale via a remote web interface, wherein the step of determining that the secondary condition has been satisfied by the purchaser further comprising:

determining via a remote web server that the web-based registration has been satisfied by the purchaser.

17. A method of packaging and activating open loop cards, the method comprising:

providing to a retailer an open loop card and a closed loop card in an integrated package, the open loop card associated with a first account number which is configured for activation by an open loop account processor, the closed loop card associated with a second account number;

providing a machine readable card component containing data comprising a visible control number corresponding to a control account, the control account further comprising the first and second account numbers, wherein the first and second account numbers are concealed from view within the integrated package;

receiving an activation request from a point of sale associated with the retailer containing data corresponding to the control account;

identifying the control account and the first and second account numbers;

activating the closed loop card in accordance with the second account number; and transmitting electronically an activation request comprising the first account number to the open loop account processor.

18. A method of packaging and activating open loop cards, the method comprising:

providing to a retailer an open loop card and a closed loop card in an integrated package, the open loop card associated with a first account number which is configured for activation by an open loop account processor, the closed loop card associated with a second account number;

providing first and second machine readable card components on the open loop card, the first machine readable card component associated with the first account number and containing data associated with predetermined conditions for activating the open loop card, the second machine readable card component associated with the second account number and containing data associated with predetermined conditions for adding value to the closed loop card;

receiving an activation request from a point of sale associated with the retailer containing data corresponding to the first and second account numbers;

activating the closed loop card in accordance with the second account number; and transmitting electronically an activation request comprising the first account number to the open loop account processor.

19. The method of claim 18, wherein the open loop card and the closed loop card are independently valued in the form of either a monetary value or a unit value.

20. The method of claim 19, the closed loop card having a value selected from a range of values, the value being hidden from a purchaser until after activation of the closed loop card.

21. The method of claim 18, wherein one or more of the first and second machine readable card components are exposed and machine readable from outside of the integrated package while the open loop card and the closed loop card are secured within the integrated package.

22. The method of claim 18, the closed loop card comprising a proxy card, wherein the second account number is associated with a value transferable by a purchaser to an associated stored value card.

23. The method of claim 18, the closed loop card comprising a loyalty card having a fixed value redeemable by a purchaser upon registration to a loyalty account associated with the retailer.

24. The method of claim 18, wherein the step of activating the closed loop card comprises enabling the closed loop card for activation based upon completion of a predetermined condition.

\* \* \* \* \*